(No Model.) 2 Sheets—Sheet 2.
W. BOWEN.
GRAIN AND SEED CLEANING MILL.
No. 272,637. Patented Feb. 20, 1883.
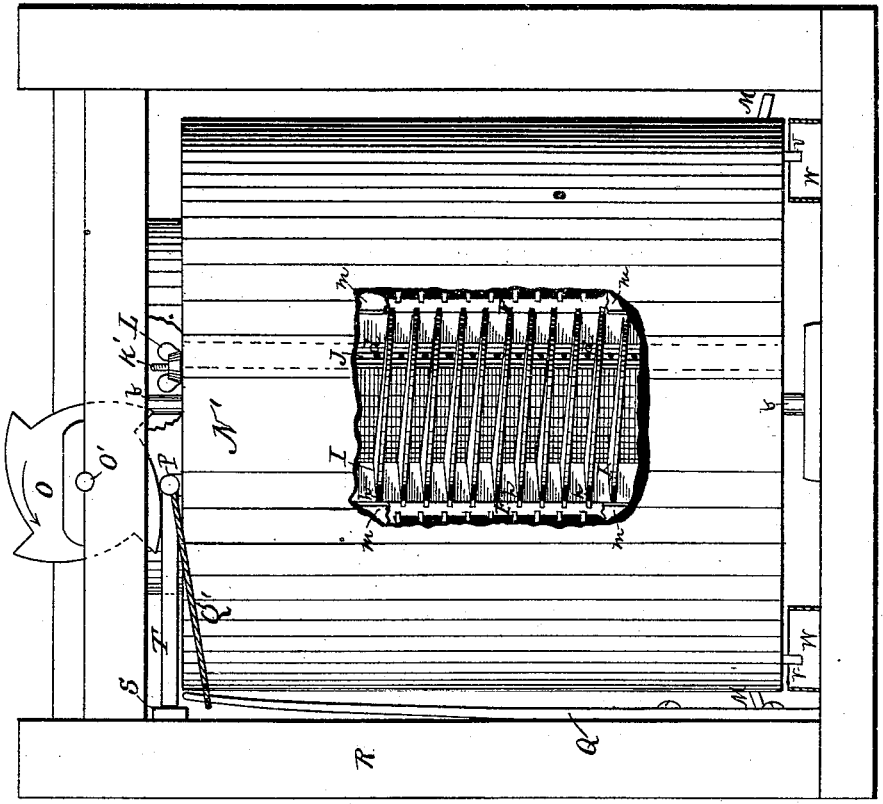
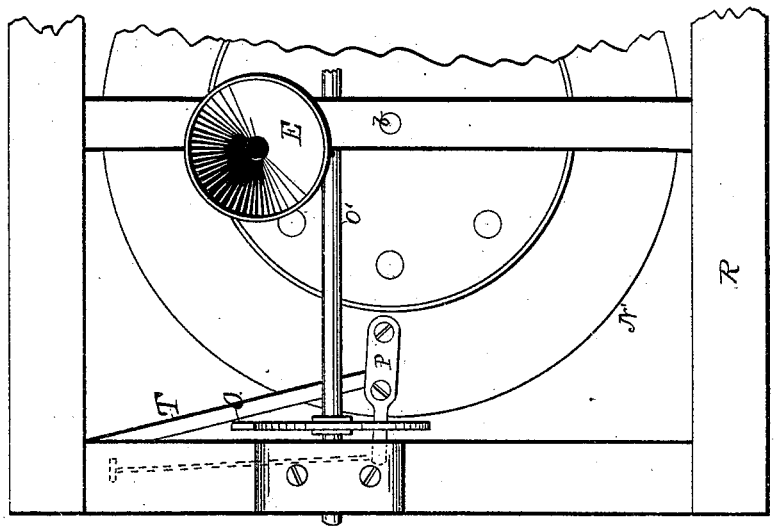
WITNESSES:
INVENTOR:
W. Bowen
BY
ATTORNEYS.

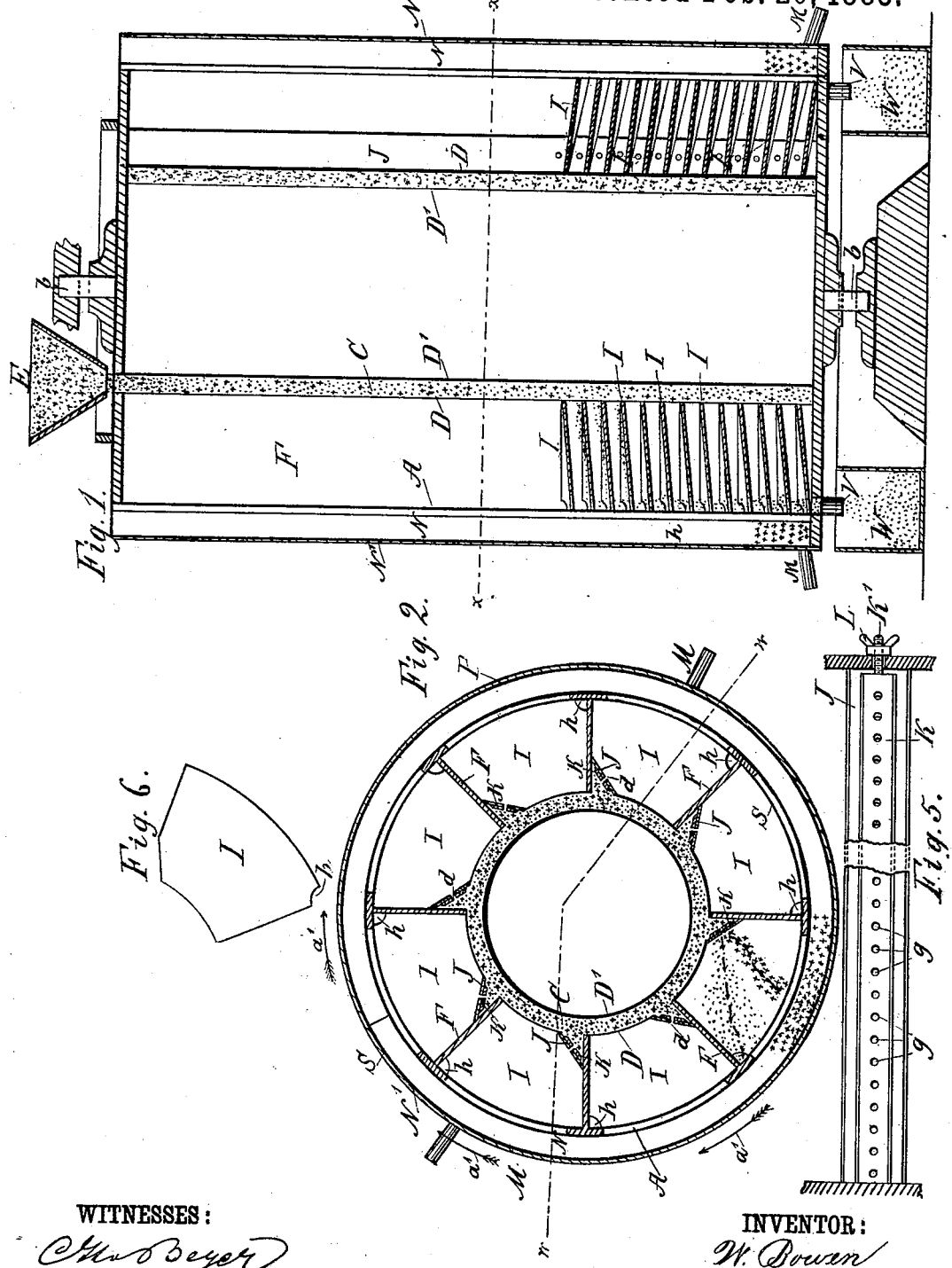

UNITED STATES PATENT OFFICE.

WILLIAM BOWEN, OF EDINA, MISSOURI.

GRAIN AND SEED CLEANING MILL.

SPECIFICATION forming part of Letters Patent No. 272,637, dated February 20, 1883.

Application filed March 24, 1882. (No model.)

*To all whom it may concern:*

Be it known that I, WILLIAM BOWEN, of Edina, in the county of Knox and State of Missouri, have invented a new and Improved Grain and Seed Cleaning Mill, of which the following is a full, clear, and exact description.

The object of my invention is to provide a new and improved mill for separating the chaff and poor seed from the good and perfect seeds or grains.

The invention consists in a cylinder provided with a series of incline plates, upon which the grains or seeds are fed, which cylinder is vibrated, so as to cause the light grains and seeds to pass to one corner of the plates, the latter being provided with apertures, through which the light grains and seeds pass, while the heavy grains and seeds, not being able to move so rapidly, pass over the front edge of the plates into a chamber surrounding the cylinder.

The invention further consists in devices for vibrating the cylinder, and in details of construction, as will be fully described and claimed hereinafter.

In the accompanying drawings, Figure 1 is a vertical section of my improved seed-cleaning mill on line $w\,w$ of Fig. 2. Fig. 2 is a horizontal section of the same on line $x\,x$, Fig. 1. Fig. 3 is a plan view of a portion of the mill. Fig. 4 is a side view, part being broken out, and Fig. 5 is a longitudinal elevation of one of the apertured sliding strips for closing the seed-entrance apertures. Fig. 6 is a plan view of one of the plates onto which the grain is fed.

A skeleton frame or hollow cylinder, A, is provided at the top and bottom with pivots $b$, which work in suitable bearings. A narrow annular compartment, C, Fig. 1, is formed within the cylinder A by two concentric cylinders, D D', which compartment is provided at the upper end with one or more funnels, E, for delivering the seed or grain thereinto. A series of radial vertical partitions, F, divide the space between the cylinder D and the cylinder A, thus forming a series of compartments. Said partitions F are provided with a series of grooves, Fig. 4, slightly inclined from the inner toward the outer edges of the partition, which grooves are adapted to receive the side edges of the shelves or plates I, so that the latter are inclined from their inner or rear edges to their outer or front edges. They are also inclined from left to right, as also shown in Fig. 4. In other words, the plates are slightly inclined downward from the inner left-hand corner toward the right left-hand outer corner, for a purpose hereinafter stated. The right inner corners are cut out, to allow space for a strip or board, J, that extends from top to bottom of the cylinder A.

For each plate I each strip or board J is provided with an aperture, $d$. A board or strip, K, provided with as many apertures $g$ as there are apertures $d$ in the strip J, and the same distance apart, is arranged to slide on the back of each strip J. A screw, K', at the top of the strip K, passes through the top of the cylinder A, and is provided with a winged nut, L, for adjusting said strip K higher or lower. The front left-hand corner of each plate I, Figs. 2, 4, and 6, is provided with an aperture, $h$.

Short tubes or spouts M project from the cylinder A at the bottom for discharging the heavier grain that passes over the front edge of the plates I and enters the annular chamber N, formed by a cylindrical casing, N', surrounding the cylinder A. The plates I are slid into the grooves, which hold them, before the vertical strips $m$ are attached to the cylinder.

A cam-wheel, O, is mounted on a shaft, O', and strikes against a projecting strip, P, attached to the top of the cylinder A. A spring, Q, is attached to a post, R, and connected to the side of the cylinder by means of a cord, Q'. An elastic cushion, S, is attached to the post above the spring, against which the bumper T strikes when the cylinder is vibrated. Short tubes or spouts V project from the bottom of the cylinder A into a receptacle, W, below the cylinder for delivering the lighter grain and chaff.

The plates I are to be made of polished or varnished wood, metal, rubber, glass, or other material which is very smooth.

The operation is as follows: The seeds, grain, or other like material pass from the chamber C through the apertures $d$ upon the plates I, when the strip or board K is so adjusted that the apertures $d$ and $g$ of the strips J and K coincide. Upon the plates I the trash or light grains or seeds pass up the inclined surface to the apertures *h* and drop through the same, and are finally collected in the receptacle W. The heavier seeds, grains, &c., will not pass up the incline of the plates, but pass over their front edges, and thus drop into the chamber N, surrounding the cylinder A, and be discharged therefrom by spouts M into suitable vessels or receptacles. The vibrating or circular reciprocating motion and sudden stop or jar given to the mill by the cam O, spring Q, and bumper T cause the above-described movements of the seeds or grains—that is to say, the cam O turns the cylinder A until the first tooth of the cam lets loose, when the spring Q pulls the cylinder back, and the bumper T then strikes against the cushion S and gives the shock.

What I claim is—

1. The combination of the plates I, placed at the inclination specified, and having an aperture at the upper edge of each, with the horizontally-vibrating cylinders or grain receptacle A D D', which is open at its outer side, and pivoted centrally at top and bottom, and thus adapted to have a circular reciprocating motion, as shown and described, whereby the chaff and light grain will pass up the inclined plates and through said apertures, while the heavier grain flows over the front edge of said plates.

2. The combination of cylinder A, having openings in its sides, the interior concentric cylinders D D', a hopper, E, for discharging grain into the space between the latter, the discharge-regulators, the plates I, arranged at an inclination, and provided with apertures, as shown, and the vertical radial partitions F, all as set forth.

3. The combination, as herein described, of the cylinder having grain-passages and separating devices, and pivoted, as shown, so as to vibrate horizontally on its vertical axis, an arm, P, and bumper T, attached to the cylinder, the cam-wheel arranged contiguous to said arm, the post R, and the spring Q and cord Q' for retracting the cylinder, all as shown and described.

WILLIAM BOWEN.

Witnesses:
T. P. COOK,
BENJAMIN BOWEN.